(12) United States Patent
Kim et al.

(10) Patent No.: US 9,380,445 B2
(45) Date of Patent: Jun. 28, 2016

(54) DEVICE AND METHOD FOR DISCOVERY CHANNEL HOPPING SCHEME

(71) Applicant: APPLE INC., Cupertino, CA (US)

(72) Inventors: Yuchul Kim, Cupertino, CA (US);
Young Jae Kim, Cupertino, CA (US);
Joonsuk Kim, Cupertino, CA (US);
Xiaowen Wang, Cupertino, CA (US);
Vinay Majjigi, Cupertino, CA (US);
Syed Aon Mujtaba, Cupertino, CA (US); Dawei Zhang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 15 days.

(21) Appl. No.: 14/252,258

(22) Filed: Apr. 14, 2014

(65) Prior Publication Data

US 2014/0314044 A1 Oct. 23, 2014

Related U.S. Application Data

(60) Provisional application No. 61/814,169, filed on Apr. 19, 2013.

(51) Int. Cl.
*H04B 1/7143* (2011.01)
*H04W 8/00* (2009.01)

(52) U.S. Cl.
CPC ............. *H04W 8/005* (2013.01); *H04B 1/7143* (2013.01)

(58) Field of Classification Search
None
See application file for complete search history.

(56) References Cited

U.S. PATENT DOCUMENTS

| 2007/0083470 | A1 | 4/2007 | Bonner et al. |
| 2009/0238242 | A1 | 9/2009 | Lee et al. |
| 2011/0085453 | A1* | 4/2011 | Wu et al. ................. 370/252 |
| 2013/0023236 | A1 | 1/2013 | Murray et al. |

FOREIGN PATENT DOCUMENTS

| CN | 102204293 | 9/2011 |
| WO | 2004/032554 | 4/2004 |
| WO | 2010/053686 | 5/2010 |
| WO | 2013/097177 | 7/2013 |

OTHER PUBLICATIONS

Baset et al., "*An Analysis of the Skype Peer-to-Peer Internet Telephony Protocol*", Oct. 11, 2004, XP002457221, http://www1.cs.cs.columbia.edu/library/TR-repository/reports, 12 pps.
Pottie et al., "*Channel Coding Strategies for Cellular Radio*", IEEE Transactions on Vehicular Technology, IEEE Service Center, vol. 44, No., Nov. 1, 1995, XP000931254 4, 8 pgs.

* cited by examiner

*Primary Examiner* — Alex Skripnikov
(74) *Attorney, Agent, or Firm* — Fay Kaplun & Marcin, LLP (57) ABSTRACT

A device and method generates a hopping scheme for mobile stations of a wireless network. The method includes receiving a number of channels N of the wireless network. The method includes generating a shuffling matrix as a function of the number of channels N, each row of the shuffling matrix being indicative of a respective one of the mobile stations, each column of the shuffling matrix being indicative of a respective broadcast time of a discovery signal in a hopping scheme. The method includes generating the hopping scheme for the mobile stations in the channels as a function of the shuffling matrix. The hopping scheme maximizes an interval between two consecutive broadcast times that any two of the mobile stations are assigned to transmit discovery signals on adjacent channels.

20 Claims, 10 Drawing Sheets

Initial Shuffling Matrix

Further Shuffling Matrices

DEVICE AND METHOD FOR DISCOVERY CHANNEL HOPPING SCHEME

BACKGROUND INFORMATION

In a wireless network, discovery is a process in which one or more mobile stations discover information about one or more neighboring devices. For example, the mobile stations may discover identity information, location information, etc. of the neighboring devices. There are a variety of manners in which the discovery process may be performed. In one exemplary manner, the discovery process includes periodically broadcasting a discovery signal using a discovery resource of the mobile station. The discovery signal may include the discovery information. Thus, when a first mobile station receives a discovery signal broadcast from a second mobile station, the first mobile station has discovered the existence of the second mobile station as a neighboring device and may further be aware of the discovery information related thereto.

The broadcasting of the discovery signal by the mobile stations may be transmitted as a function of a type of system on which the mobile station is operating. In a first example, the mobile stations may broadcast the discovery signal as a function of time. Accordingly, a time division multiple access (TDMA) system may be utilized in which different time slots are designated for the broadcast. In a second example, the mobile stations may broadcast the discovery signal as a function of a code. Accordingly, a code division multiple access (CDMA) system may be utilized in which a code is used for each broadcast. In a third example, the mobile stations may broadcast the discovery signal as a function of a frequency time resource (e.g., a set of subcarriers at a certain timeframe). Accordingly, a frequency division multiple access (FDMA) or orthogonal FDMA (OFDMA) system may be utilized in which a frequency band or division of frequency bands (i.e., channel) is used.

In the FDMA or OFDMA system, the dynamic mapping of a discovery channel to a physical time frequency resource (discovery resource) is called channel hopping. Channel hopping is required to achieve frequency diversity and to minimize adjacent channel interference. Frequency diversity is required to overcome the impact of frequency selectivity or to average out interference from a neighboring cell(s) through a discovery channel in which the discovery signal is broadcast. Mitigating adjacent interference is required since, in OFDMA system, a receiver listens to two or more discovery signals at the same time. Signals from different users may have leakage to adjacent channels, which cause multi-user interference or adjacent channel interference especially when the power levels from difference users are not balanced. Therefore, the channel in which the discovery signals are broadcast from respective mobile stations in the wireless network must be sufficiently diverse in the location of the physical resource to avoid or minimize such interference.

Conventional manners of transmitting discovery information based on frequency (and channels) include synchronizations, resource orthogonalization, channel hopping, etc. such that the discovery information is transmitted across multiple nodes in a resource-efficient, fast, and reliable manner with little coordination. Frequency domain channel hopping is a method to transmit the signals in wideband systems by selecting a different frequency resource among many available frequency resources. Conventionally, a pseudorandom sequence known to both transmitter and receiver is used so the intended receiver listens to the correct channel. However, this pseudorandom sequence includes drawbacks. For example, they may make any two channels collide in the same time and frequency resource; they may lack frequency diversity; they may make any two channels be adjacent relatively often than others; etc. Given the requirements of frequency diversity for discovery signals, the frequency domain hopping scheme should make any discovery resource hop over an entire bandwidth with possibly equal frequency. Furthermore, the frequency domain hopping scheme should randomize neighboring discovery channels in the frequency domain to make the period that any two discovery channels are adjacent with each other as large as possible.

Accordingly, there is a need for addressing the above noted drawbacks of conventional frequency hopping and for providing a hopping scheme that randomizes the mapping between a discovery channel and a discovery resource to mitigate the potential adjacent channel interference for achieving frequency diversity.

DETAILED DESCRIPTION

The exemplary embodiments relate to a device and method comprising receiving a number of channels N of a wireless network; generating a shuffling matrix as a function of the number of channels N, each row of the shuffling matrix being indicative of a respective one of a plurality of mobile stations, each column of the shuffling matrix being indicative of a respective broadcast time of a discovery signal in a hopping scheme; and generating the hopping scheme for the mobile stations in the channels as a function of the shuffling matrix, wherein the hopping scheme dynamically maps a physical resource of the mobile station to one of the channels, wherein the hopping scheme is generated such that each channel hops across all of the physical resources with substantially equal frequency, and wherein the hopping scheme maximizes an interval between two consecutive broadcast times that any two of the mobile stations are assigned to transmit discovery signals on adjacent channels.

The exemplary embodiments may be further understood with reference to the following description of the exemplary embodiments and the related appended drawings, wherein like elements are provided with the same reference numerals. The exemplary embodiments are related to a device and method for determining a hopping scheme in a discovery process for a plurality of mobile stations in a wireless network. The hopping scheme is generated as a function of a shuffling matrix and, optionally, additional modifications to the shuffling matrix. The shuffling matrix indicates a discovery channel to be used by a particular discovery resource of one of the mobile stations at a particular time. The shuffling matrix may be generated as a function of different shuffling algorithms of which two exemplary shuffling algorithms will be described. As will be explained in further detail below, the hopping scheme according to the exemplary embodiments spread a hopping pattern over an entire frequency band to maximize frequency diversity while maximizing a period that any two transmitting nodes neighboring in the frequency domain. The wireless network, the discovery process, the mobile stations, the hopping scheme, the shuffling matrix, the additional modifications, the shuffling algorithms, and related methods for generating the shuffling matrices and the hopping scheme will be explained in further detail below.

Figure 1:
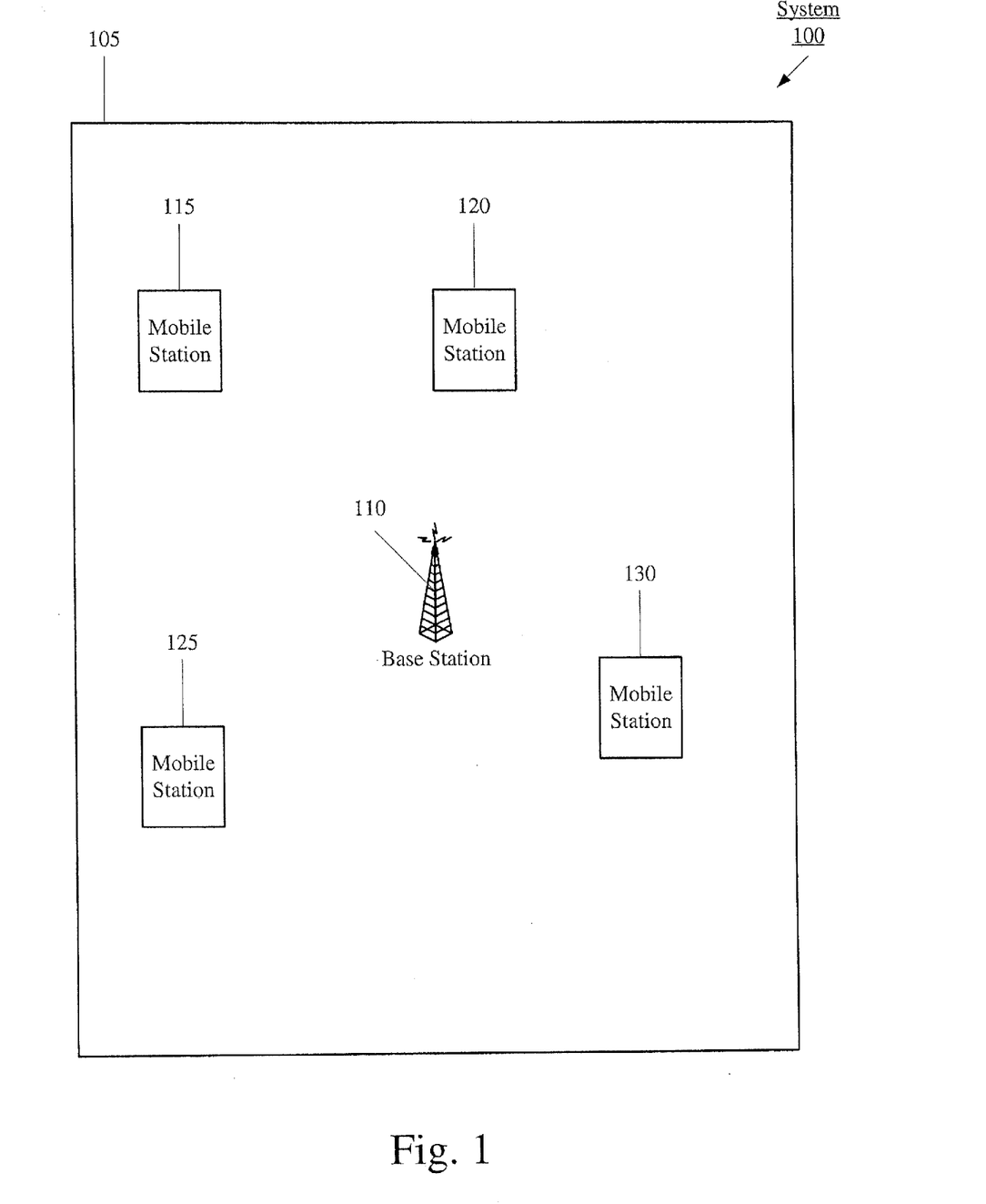
FIG. 1 shows a system for discovering neighboring devices using channel hopping according to the exemplary embodiments.

FIG. 1 shows a system 100 for discovering neighboring devices using channel hopping according to the exemplary embodiments. The system 100 is for a wireless network including one or more cells. For example, a cell 105 is shown in FIG. 1. Within the cell 105, a base station 110 is disposed with one or more antennas. The base station 110 may be configured to receive and transmit data (e.g., signals) to devices disposed within the cell 105. As illustrated in FIG. 1, there may be four mobile stations 115-130 disposed in the cell 105. For purposes of the description herein, the channel hopping scheme will be described with regard to these four mobile stations 115-130. However, those skilled in the art will understand that any number of mobile stations may be disposed within a given cell, further network components may be disposed within the cell (e.g., amplifiers), etc.

The mobile stations 115-130 may represent any electronic device that is configured to perform wireless functionalities. For example, the mobile stations 115-130 may be a portable device such as a phone, a smartphone, a tablet, a phablet, a laptop, etc. The mobile stations 115-130 may include a processor, a memory arrangement, a display device, an input/output (I/O) device, a transceiver, a baseband processor, and other components such as an audio input device and an audio output device, a battery, a data acquisition device, ports to electrically connect the station 110 to other electronic devices, etc.

It should be noted that the wireless network may include any number of cells. The cells may be disposed adjacent one another such that a mobile station may travel from one cell to another and remain connected to the wireless network. Each cell may include a respective base station. It should also be noted that the mobile stations 115-130 may include transceivers such that data may be received/transmitted between the mobile stations 115-130 and the base station 110. The transceivers of the mobile stations 115-130 may further be configured to receive/transmit data among the mobile stations 115-130. Specifically, the transceivers may be used to broadcast and receive discovery signals. As will be described in further detail below, the transceivers may be configured to operate at a predetermined channel, discovery resource (physical time frequency resource), and hopping scheme.

The exemplary embodiments relate to determining a hopping scheme for the mobile stations 115-130 in a discovery process. For example, the hopping scheme relates to transmitting discovery signals among mobile stations 115-130. Each mobile station is assigned a distinct discovery channel to send out a discovery signal through their respective discovery channel. The dynamic mapping between discovery resource and channel is determined by the hopping scheme. The hopping scheme is designed to be achieved following at least two aspects: frequency diversity and neighbor channel diversity.

The frequency diversity for a channel is achieved if a channel hops to another frequency resource every time the channel is transmitted such that it hops over all available frequency resources with equal frequency. It is desirable that a hopping scheme is designed such that every channel achieves this goal. Neighbor channel diversity is achieved if the time period that any two channels are adjacent is maximized. It is noted that any two channels are supposed to neighbor over and over due to the limited number of frequency resources.

The exemplary hopping scheme described herein satisfies the frequency diversity and neighbor channel diversity by utilizing a specialized shuffling matrix according to the exemplary embodiments.

The hopping scheme may be determined by a variety of components of the system 100. For example, the base station 110 may include a processor and a memory arrangement that determines the hopping scheme for the mobile stations 115-130. In another example, one of the mobile stations 115-130 may include a respective processor and a respective memory arrangement that determines the hopping scheme. To describe the exemplary embodiments, the methods of determining the hopping scheme will be described with reference to one of the mobile stations 115-130 (specifically mobile station 115). As each mobile station 115-130 is associated with the cell 105 and, therefore, also the base station 110, data packets may be transmitted among each of the mobile stations 115-130 such that the hopping scheme is known or the data packets could be transmitted from the base station 110 to each mobile stations 115-130 to signal specific hopping channels to be used by the mobile stations 115-130.

Figure 5A:
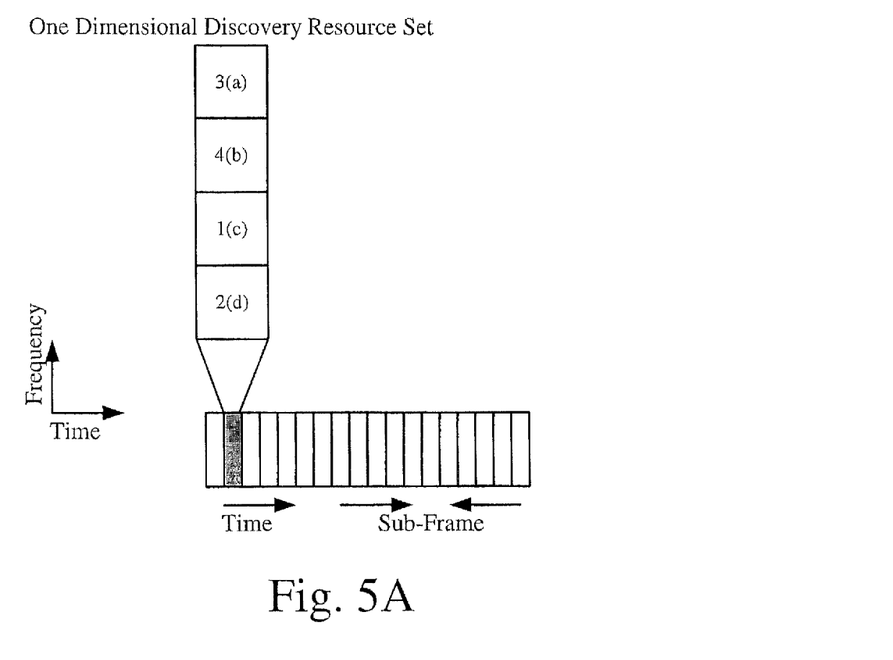
FIG. 5A shows a one-dimensional discovery resource set according to the exemplary embodiments.
Figure 5B:
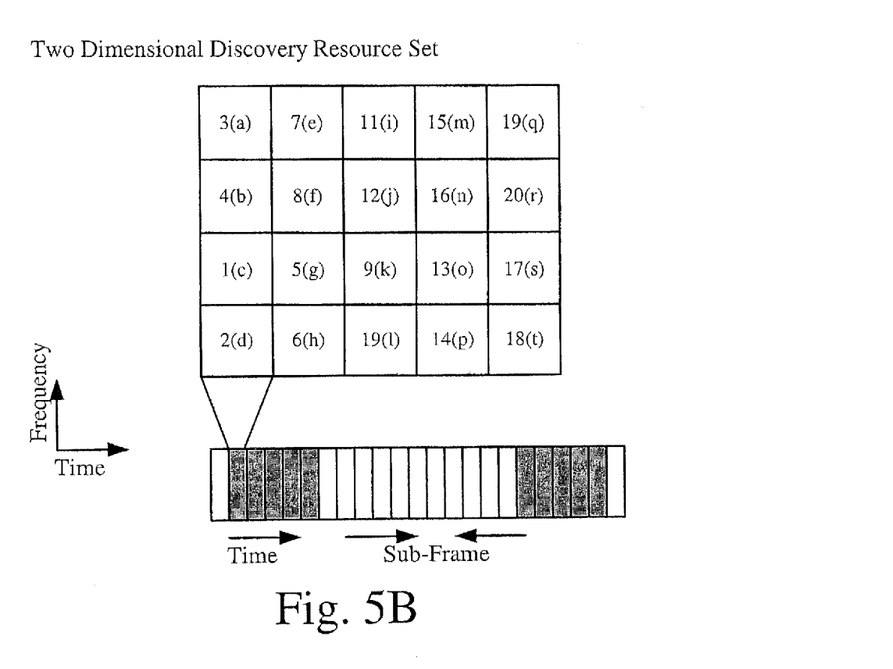
FIG. 5B shows a two-dimensional discovery resource set according to the exemplary embodiments.

The hopping scheme may relate to designating a discovery channel for each of the mobile stations 115-130 to broadcast the discovery signal at a known time. The discovery channel may therefore be a logical channel, which is mapped to a respective one of the mobile stations 115-130. At a known time, a discovery channel is mapped to a discovery resource that is a physical resource; the mapping is changing dynamically and is dictated by the hopping scheme. The set of consecutive discovery resources is called a discovery resource set. A certain number of sub-frames (time slots) may be reserved as a discovery resource set. FIG. 5A shows a one-dimensional discovery resource set according to the exemplary embodiments while FIG. 5B shows a two-dimensional discovery resource set according to the exemplary embodiments. Specifically, FIGS. 8A-B show two examples of a discovery resource set, discovery resources, and the mapping to the discovery channel. In FIG. 5A, four discovery channels 3, 4, 1, and 2 are mapped to discovery resources a, b, c, and d, respectively, during one sub-frame. In FIG. 5B, there is a two dimensional mapping between 20 discovery channels and 20 discovery resources during five consecutive sub-frames reserved for discovery signal transmission among the mobile stations. As will be explained in further detail below, the hopping scheme is for a given discovery resource set.

Figure 2:
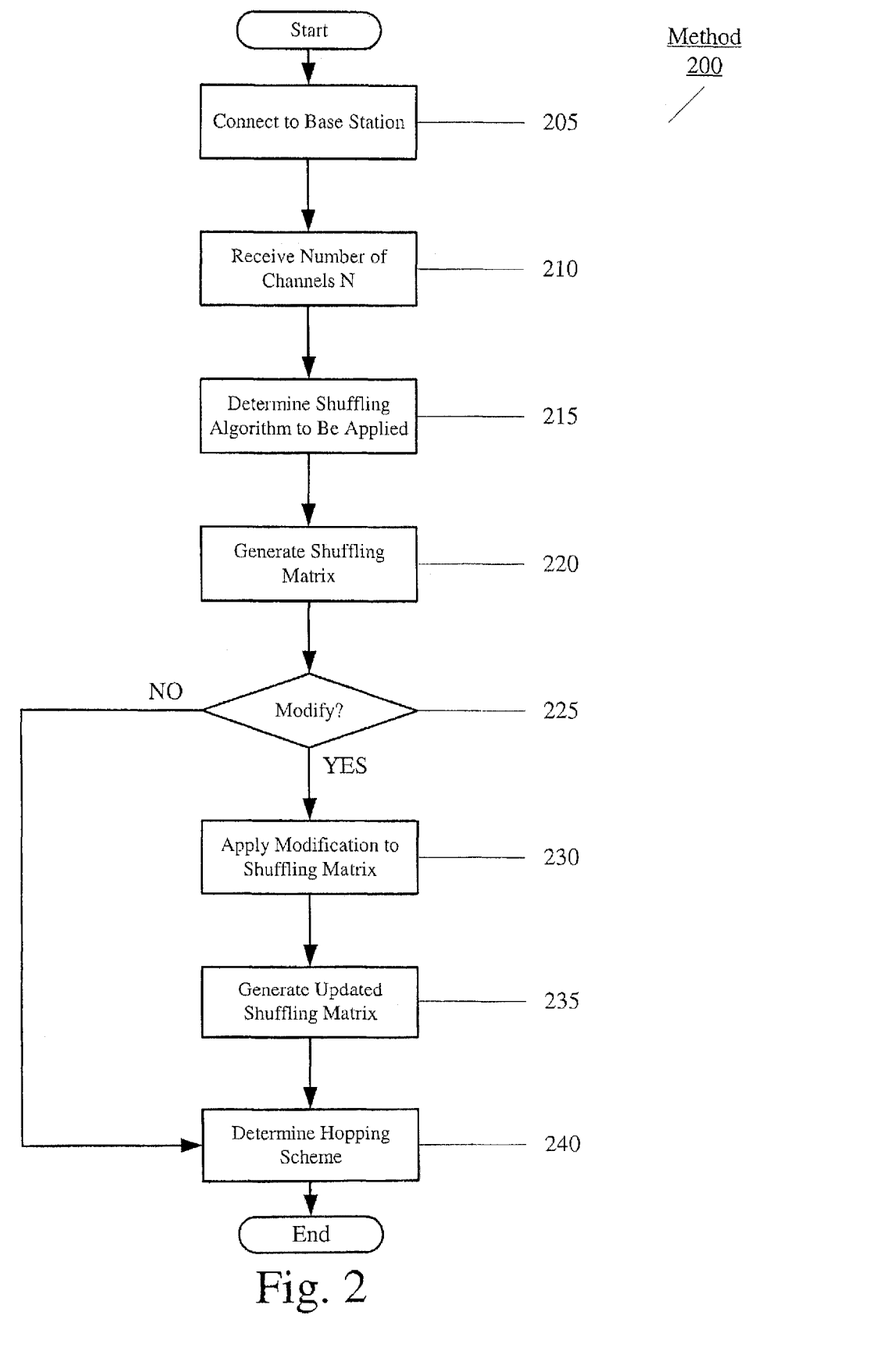
FIG. 2 shows a method for determining a hopping scheme according to the exemplary embodiments.

FIG. 2 shows a method 200 for determining a hopping scheme according to the exemplary embodiments. The method 200 relates to determining the hopping scheme as a function of a shuffling matrix. According to the exemplary embodiments, the shuffling matrix may be defined using a shuffling algorithm that will be described in further detail below with reference to FIGS. 3 and 4. The method 200 will be described with reference to the system 100 of FIG. 1. Specifically, the method 200 will be described with reference to the mobile station 115 determining the hopping scheme.

In step 205, the mobile station 115 connects to the base station 110. The mobile station 115 may connect to the base station 110 using any known manner. For example, a conventional handshake procedure may be used; an authentication procedure may be used; a roaming procedure may be used (when the mobile station 115 moves from a further cell into the cell 105); etc. Once connected to the base station 110, the mobile station 115 is now associated with the cell 105.

In step 210, the mobile station 115 receives the number of discovery channels from the base station 110. For example, the base station 110 may transmit data packets indicating the number of available channels. The number of channels may be predetermined as a function of a variety of factors. In a first example, the number of channels may be based upon a current number of mobile stations associated with the cell 105 or the number of mobile stations associated with the multiple neighboring cells including the cell 105. In a second example, the number of channels may be based upon a division of a bandwidth for a set of frequencies (e.g., a bandwidth for a total frequency range is divided evenly into multiple consecutive frequency ranges each representing a single channel). In a third example, the number of available channels may be predetermined in which reserve channels may be prevented from being used until criteria are met to utilize the reserve channels.

Figure 3:
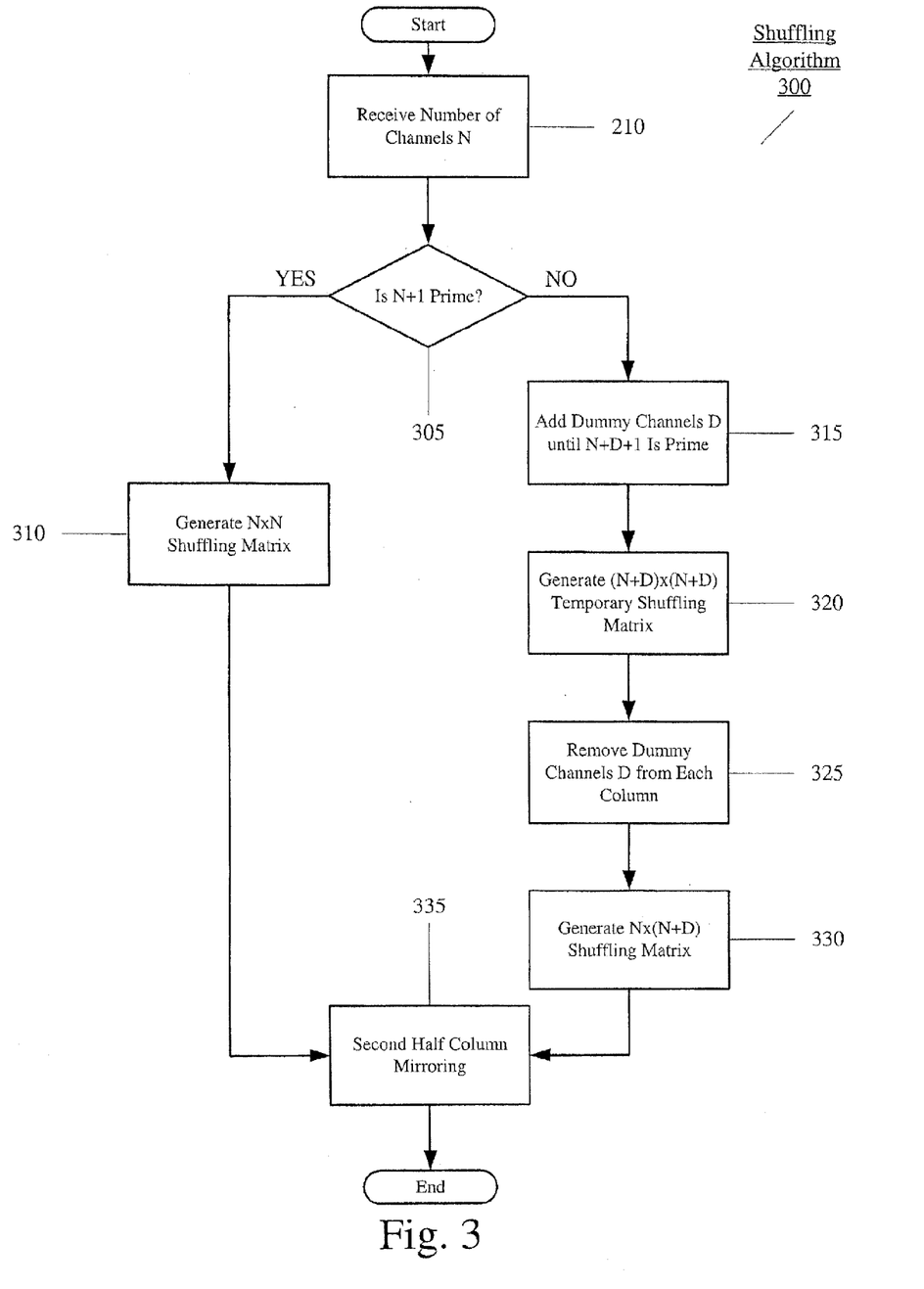
FIG. 3 shows a first method for generating a shuffling matrix according to the exemplary embodiments.
Figure 4:
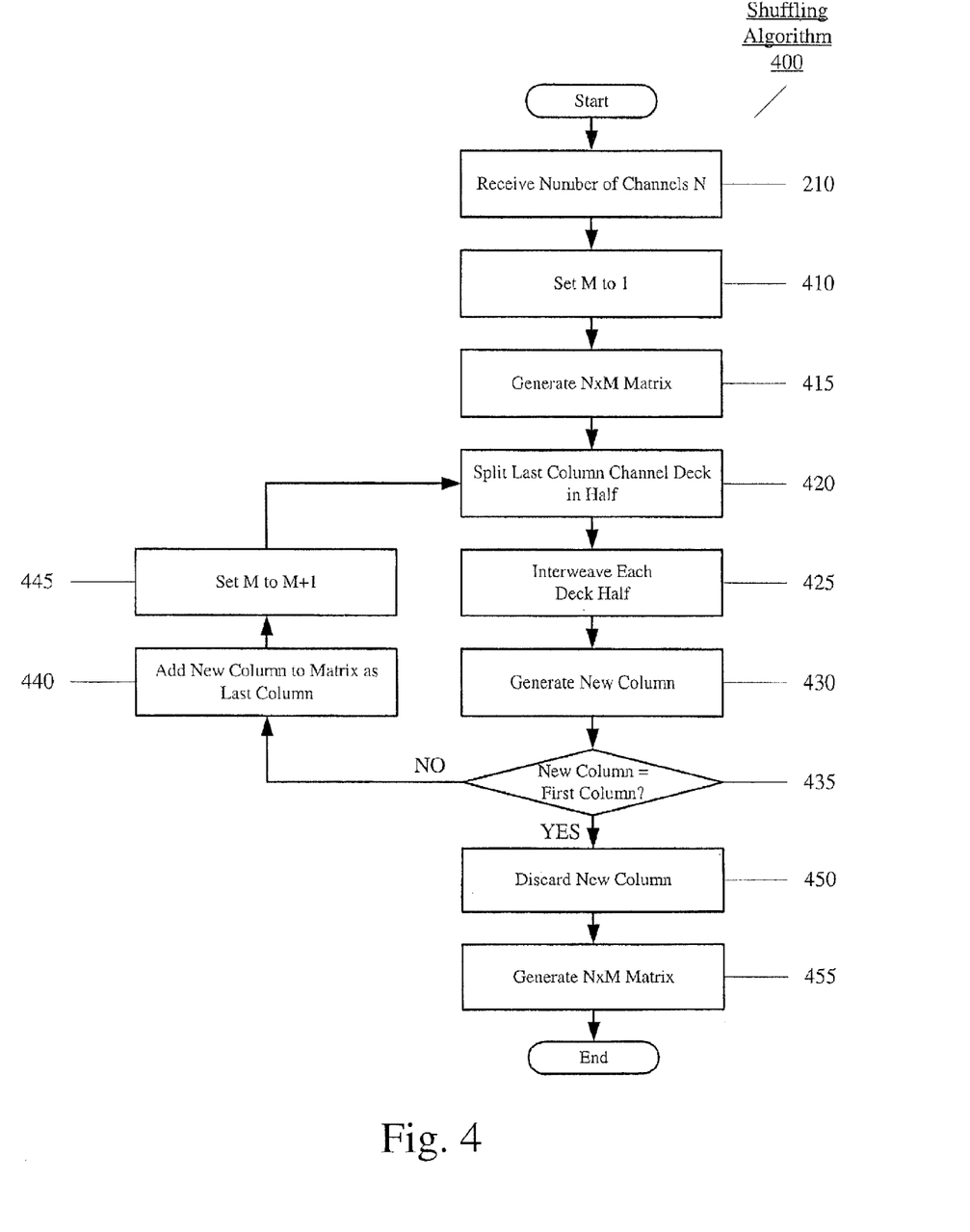
FIG. 4 shows a second method for generating a shuffling matrix according to the exemplary embodiments.

In step 215, the mobile station 115 determines a shuffling algorithm to be applied to generate the shuffling matrix in step 220. The shuffling algorithm that should be used may be predetermined or may be transmitted to the mobile station by the base station 110. Steps 215 and 220 will be described in further detail below with reference to FIGS. 3 and 4 in which FIG. 3 is for a first exemplary shuffling algorithm and FIG. 4 is for a second exemplary shuffling algorithm. The shuffling matrix generated in step 220 represents a hopping pattern to be utilized in the hopping scheme. The shuffling matrix has dimensions [h×cycle], where the value of h is a number of discovery resources in the frequency domain and the cycle is a number of shuffling rounds or number of columns in the matrix. Each of the columns of the shuffling matrix includes a full list of the channels. If the discovery resource is reserved in a frequency domain only as shown in FIG. 5A, the channels in each column of the matrix corresponds to the channels received in step 210. However, if the discovery resource is reserved in both the frequency and time domain as shown in FIG. 5B, the channels in the same row may be treated as a single super channel to which hopping is applied. That is, in FIG. 5B, whenever the discovery resource set occurs, rows are shuffled according to the shuffling matrix. More specifically, an element in an i-th row and a j-th column in the shuffling matrix is a discovery channel number mapped to a discovery resource (i) at the j-th shuffling round. A specific, exemplary shuffling matrix will be discussed in detail below. It should be noted that the use of the rows representing the discovery resources and the columns representing the shuffling rounds is only exemplary. The representations of the rows and columns may also be switched.

To exemplify the above explanation of the shuffling matrix, the following exemplary shuffling matrix is considered in which the number of discovery resources (DR) is four (4) and the number of cycles is also four (4).

| DR(1) | 1 | 2 | 3 | 4 |
| DR(2) | 2 | 3 | 4 | 1 |
| DR(3) | 3 | 4 | 1 | 2 |
| DR(4) | 4 | 1 | 2 | 3 |

The above shuffling matrix indicates that in shuffling round 1 (column 1), the DR(1) maps to discovery channel 1. In shuffling round 2 (column 2), the DR(2) maps to discovery channel 3. In shuffling round 4, DR(4) maps to discovery channel 3. A manner of generating the shuffling matrix is described in greater detail below.

It should also be noted that the shuffling matrix may be pre-generated and loaded onto the mobile station. For example, the steps 215 and 220 may be performed prior to the deployment of the mobile station and the various shuffling matrices for different numbers of channels may be stored in a memory arrangement of the mobile station.

In step 225, a determination is made whether the shuffling matrix generated in step 220 is to be modified. That is, a modification may be used to further provide additional forms of the shuffling matrix. It should be noted that the original shuffling matrix that is determined in step 220 may also be used to determine the hopping scheme without further modification.

As an exemplary embodiment, a modification that may be applied is a column reordering. When a shuffling matrix is generated, its columns may be reordered resulting in one or more different matrices depending on the order. For a column reordering, assuming K columns in a given shuffling matrix, a total number of shuffling matrices that may be additionally generated from a column reordering is K!−1. For example, in the above example, with four (4) columns, twenty-three (23) further permutations of the shuffling matrix may also be generated from column reordering.

Figure 6:
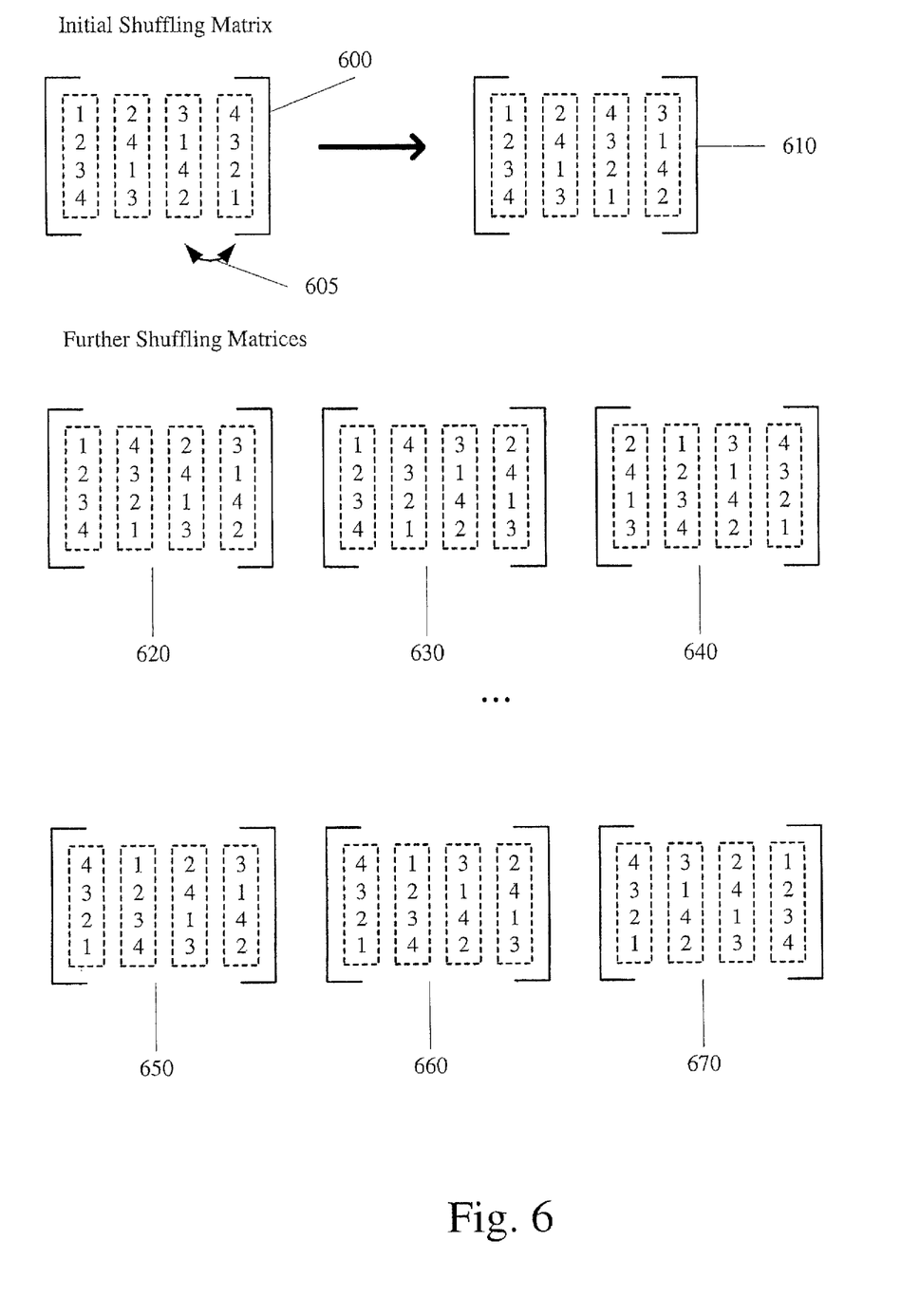
FIG. 6 shows a column reordering of a shuffling matrix according to the exemplary embodiments.

FIG. 6 shows an exemplary column reordering in which the initial shuffling matrix 600 has four (4) columns according to the exemplary embodiments. As shown by the arrow 605, the columns 3 and 4 of the initial shuffling matrix 600 may be reordered to result in the shuffling matrix 610. Additional matrices 620-670 may also be generated using a similar column reordering.

In step 230, should a modified shuffling matrix be used, the modification(s) is applied to the shuffling matrix. Thus, in step 235, an updated shuffling matrix is generated. In step 240, the hopping scheme is determined as a function of the shuffling matrix. As discussed above, the hopping scheme may be the manner in which a discovery resource of the mobile station 115 is to hop to the various channels at a given time period in the sub-frame.

It is noted that the mobile stations 115-130 may determine the shuffling matrix individually. The mobile stations 115-130 may receive a signal from, for example, the base station 110 that indicates the shuffling algorithm to be used and the number of channels. The algorithm may be pre-programmed in other component of the mobile station and only the number of channels may be signaled. Accordingly, the mobile stations 115-130 may determine identical shuffling matrices. It is noted that the base station 110 may also determine the shuffling matrix to be used for the hopping scheme. In such an exemplary embodiment, the base station 110 may transmit the hopping scheme to each of the mobile stations 115-130. The base station 110 may also synchronize the mobile stations 115-130 when the seed channel is received by each of the mobile stations 115-130 such that when the hopping scheme is initiated, each of the mobile stations 115-130 are properly broadcasting their discovery signal on the predetermined discovery channel at the predetermined time within the sub-frame.

FIG. 3 shows a first method for generating a shuffling matrix according to the exemplary embodiments. Specifically, FIG. 3 is a shuffling algorithm 300 that is determined for use in step 215 of the method 200. As will be described in further detail below, the shuffling matrix that is generated by the shuffling algorithm 300 corresponds to the shuffling matrix generated in step 220 of the method 200. The shuffling algorithm 300 begins with receiving the number of channels as discussed above in step 210 of the method 200 of FIG. 2. That is, the shuffling algorithm 300 directly relates to the number of channels available in the frequency domain.

In step 305, a determination is made whether the number of channels N plus one (1) is a prime number. If N+1 is a prime number, the shuffling algorithm 300 proceeds to step 310. In step 310, an N×N shuffling matrix is generated. For example, the N×N shuffling matrix may be generated the following:

$$DC(i,t)=\mod(i*t,N+1)$$

where N is the total number of channels, i is a resource index with $1\leq i\leq N$, and t is a shuffling round index with $1\leq t\leq N$. $\mod(x,N+1)$ denotes a modular operation x mod N+1. The above $DC(i,t)$ indicates the channel index mapped to the resource index i in the shuffling round t. Therefore, the N×N shuffling matrix may be generated. After the N×N matrix is generated, mirroring operation is performed, which is explained below.

If N+1 is a prime number, then the N×N shuffling matrix is considered a "good" matrix. Specifically, it is considered a good matrix if the N×N shuffling matrix satisfies two properties: (1) each element neighbors with all other elements in the column direction two times per cycle and (2) each element hops over all possible row locations. The method then proceeds to step 335 where a second half column mirroring is applied. This step is performed whether N+1 is a prime number or not and will be described in greater detail below.

Returning to step 305, if the number of channels N plus one (1) is not a prime number, the shuffling algorithm 300 continues to step 315. In step 315, a number of dummy channels D is added to N+1 until a prime number is reached. For example, if the number of channels N is fourteen (14), the value of N+1 is fifteen (15), thereby the number of dummy channels D that is required is two (2) such that N+D+1 is seventeen (17) or prime.

In step 320, a temporary shuffling matrix is generated having dimensions of (N+D)×(N+D). Thus, a substantially similar shuffling matrix is generated as if the value of N+1 were to be prime. In step 325, the dummy channels D are removed from each column such that in step 330, a N×(N+D) shuffling matrix is generated. Although not a "good" shuffling matrix per se, such a shuffling matrix may be used for cases when N+1 is not a prime number.

Figure 11:
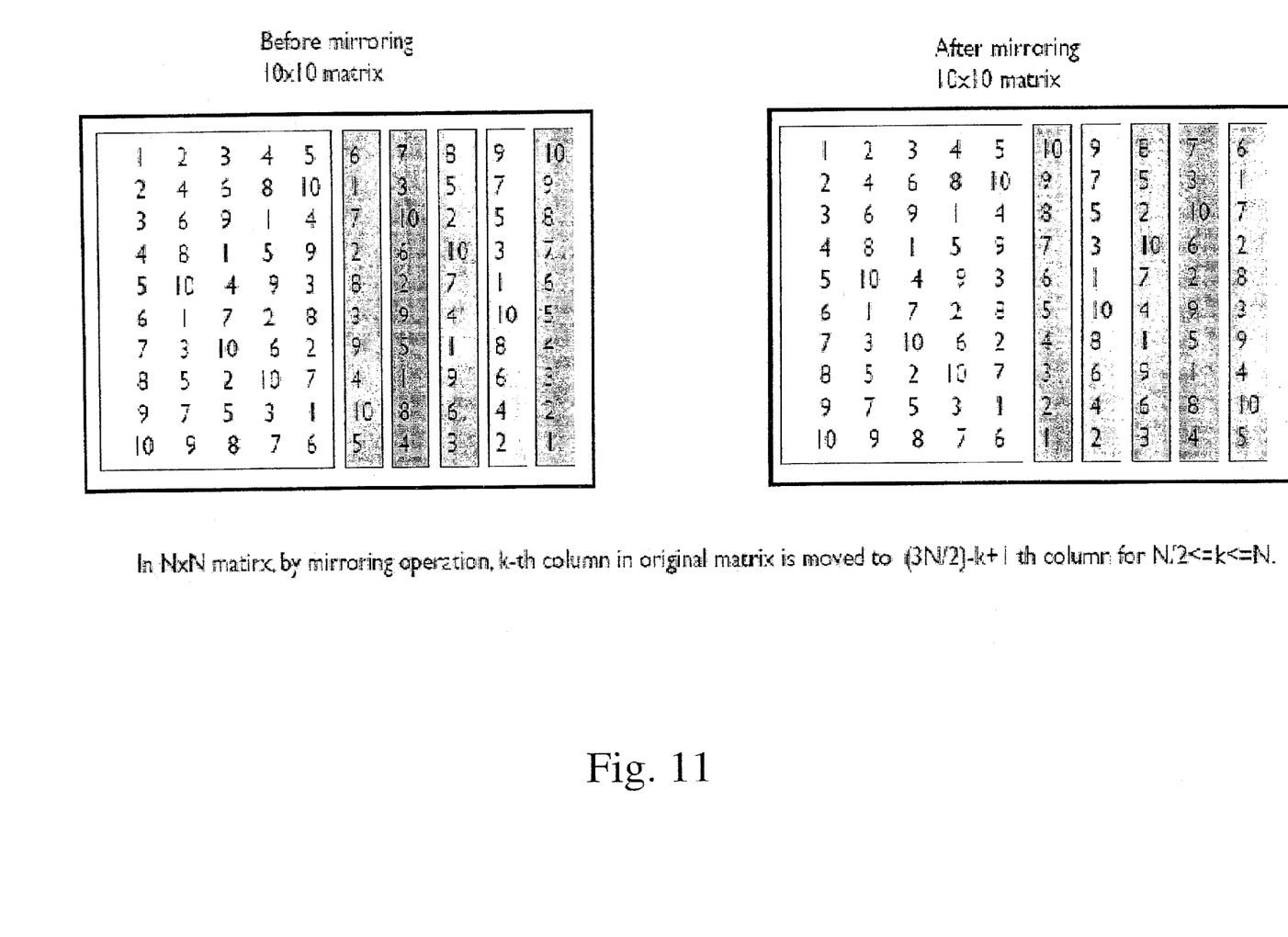
FIG. 11 shows an example of a mirroring operation on a second half of columns in an N×N matrix.

As shown in FIG. 3, whether the N×N shuffling matrix is generated in step 310 or the N×(N+D) shuffling matrix is generated in step 330, each of these matrices may then be subjected to a second half column mirroring step 335. The mirroring operation to the second half columns of the matrix in step 335 is performed as follows. If an N×N matrix is given, then the second half columns of the matrix (from N/2+1 th column to N th column) is mirrored. More specifically, k-th column in original matrix is moved to (3*N/2)−k+1 th column for $N/2\leq k\leq N$. FIG. 11 shows an example of mirroring when N=20.

Therefore, the N×(N+D) shuffling matrix generated in step 330 corresponds to the shuffling matrix generated in step 220 of the method 200.

Thus, at the completion of the shuffling algorithm 300, the shuffling matrix is generated for the number of channels available to the mobile stations 115-130. This shuffling matrix is the matrix generated in step 220 of the method 200 assuming the exemplary shuffling algorithm 300 is selected for use in the system.

FIG. 4 shows a second method for generating a shuffling matrix according to the exemplary embodiments. Specifically, FIG. 4 is a shuffling algorithm 400 that is determined for use in step 215 of the method 200. As will be described in further detail below, the shuffling matrix that is generated by the shuffling algorithm 400 corresponds to the shuffling matrix generated in step 220 of the method 200. The shuffling algorithm 400 begins with receiving the number of channels as discussed above in step 210 of the method 200 of FIG. 2. That is, the shuffling algorithm 400 directly relates to the number of channels.

In step 410, a value M is initially set to 1. Accordingly, in step 415, a temporary shuffling matrix is generated having dimensions N×M. As the value of M has been set to 1, an initial temporary shuffling matrix generated in step 415 has dimensions N×1.

In step 420, the last column of the N×M temporary shuffling matrix representing a column channel deck is split in half. Again, in this case, there is only a single column and thus, the single column represents the last column of the N×M temporary shuffling matrix. In step 425, each deck half is interwoven to a new, additional column. According to the exemplary embodiments, the interweaving process includes moving channels from the first half of a column to different positions in the next column, moving channels from the second half to different positions in the next column, etc.

More specifically, the n-th position in the first half of a column is moved to 2*n-th position in the next column. The n-th position the second half of a column is moved to 2*n−1-th position in the next column. For example, when the number of channels in the channel deck of a column is four (4), the first channel in the first half at the first position (1×1 position) is moved to the second position (2×2 position) in a further column; the second channel in the first half at the second position (2×1 position) is moved to the fourth position in the further column (4×2 position); the first channel in the second half at the first position (3×1 position) is moved to the first position in the further column (1×2 position); and the second channel in the second half at the second position (4×1 position) is moved to the third position of the further column (3×2 position). Thus, in step 430, a new column is generated.

In step 435, a determination is made whether the new column is the same as the first column (e.g., M=1) of the temporary shuffling matrix. If the new column is different, the shuffling algorithm 400 continues to step 440 where the new column is added to the temporary shuffling matrix as the last column. In step 445, the value of M is replaced with M+1. In this manner, a new temporary shuffling matrix is generated in having dimensions N×M where M is the number of columns.

Figure 7:
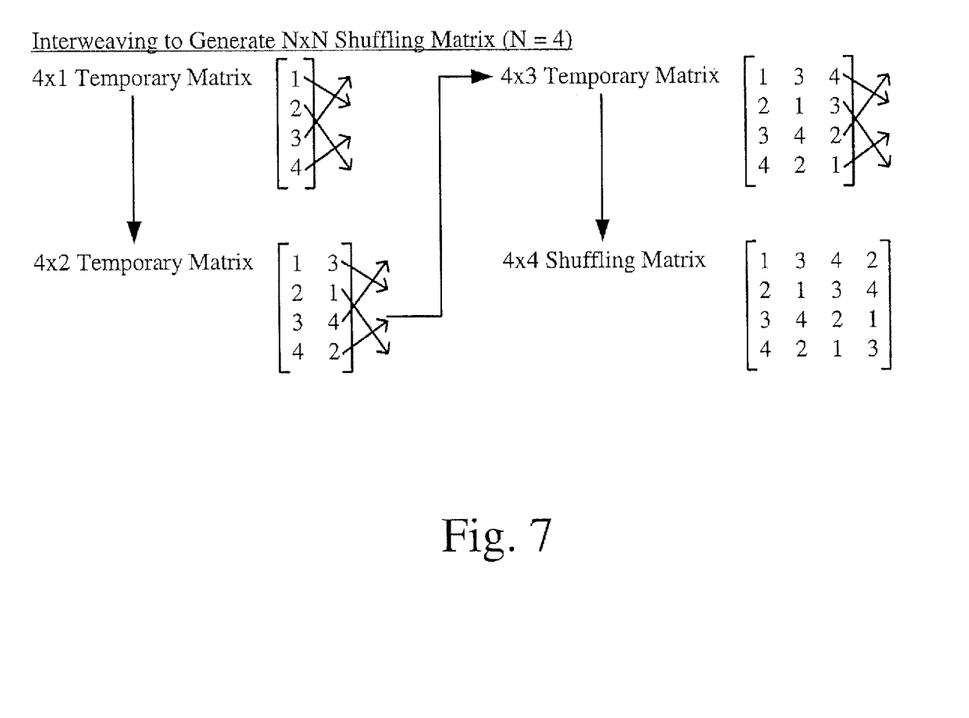
FIG. 7 shows an interweaving to generate a shuffling matrix according to the exemplary embodiments.

Returning to step 435, if the new column is the same as the first column, the shuffling algorithm 400 continues to step 450. In step 450, the new column is discarded. Thus, in step 455, the N×M shuffling matrix is generated. FIG. 7 shows an exemplary interweaving to generate the shuffling matrix according to the exemplary embodiments.

Once a shuffling matrix is generated, the shuffling matrix may be used in two different ways: 1) row shuffling only or 2) row shuffling with row shifting. Each way will be described in further detail below.

Figure 8:
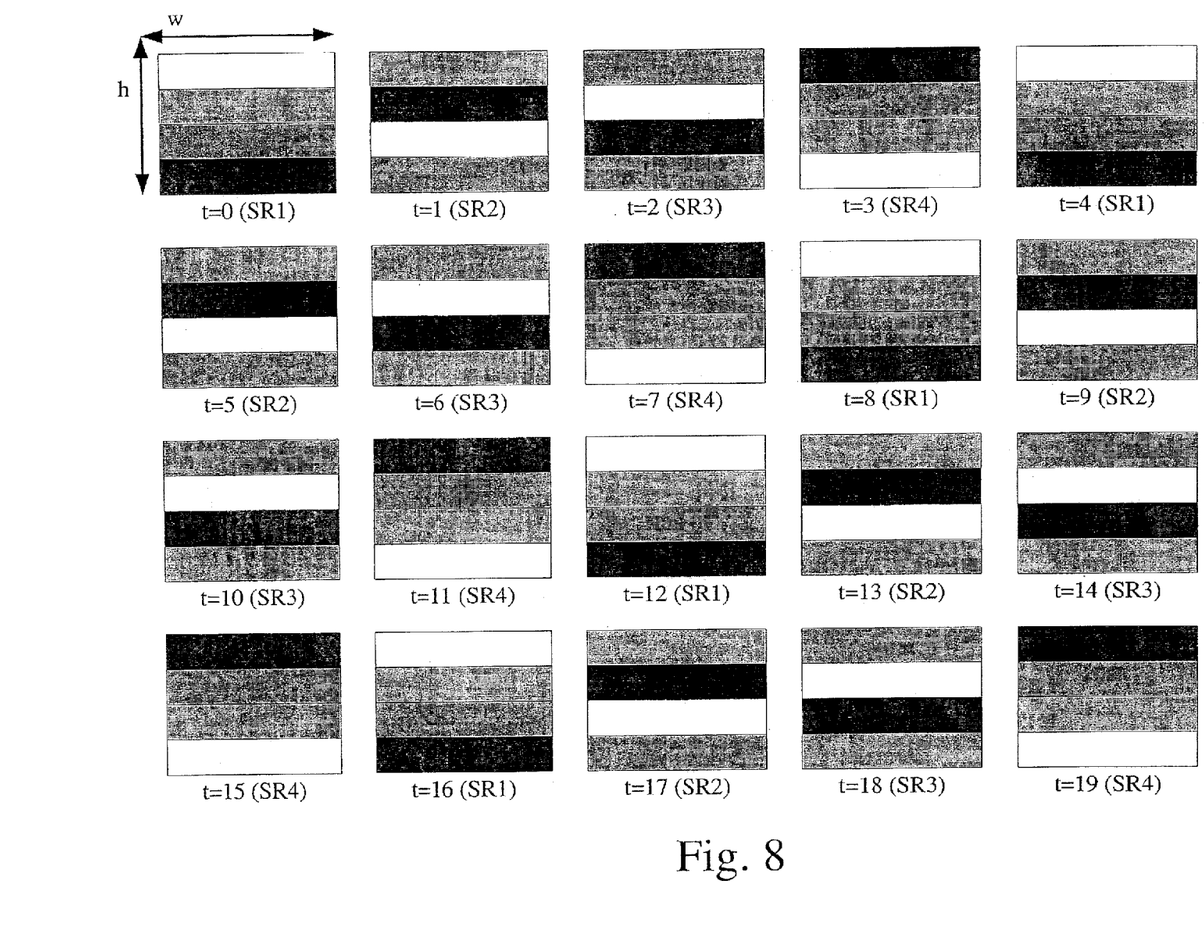
FIG. 8 shows a first use of the shuffling matrix according to the exemplary embodiments.

FIG. 8 shows a first use of the shuffling matrix according to the exemplary embodiments. Specifically, a discovery channel or a set of discovery channels in a common row is shuffled according to the shuffling matrix whenever the discovery resource set occurs. FIG. 8 shows 20 discovery resource sets which occur periodically in time. Each discovery resource set has 20 discovery resources to support up to 20 mobile stations. Five discovery resources in the same row are grouped together and shaded accordingly as they are shuffled together in the hopping. The shading of the row identifies different sets of channels.

At t=0, shuffling round 1 (SR1) is applied. The white channel group is mapped to the first discovery resource position in the frequency domain (i.e., first row); the light gray channel group is mapped to the second discovery resource position in the frequency domain (i.e., second row); the dark gray channel group is mapped to the third discovery resource position in the frequency domain (i.e., third row); and the black channel group is mapped to the fourth discovery resource position in the frequency domain (i.e., fourth row). At time t=1, the white channel group is mapped to the third discovery resource position in frequency domain (i.e., third row); the light gray channel group is mapped to the first discovery resource position (i.e., first row); the dark gray channel is mapped to the fourth discovery resource position (i.e., fourth row); and the black channel is mapped to the second discover resource position (i.e., second row). In this manner, rows are shuffled according to the shuffling matrix whenever the DRS occurs. Using approach, both frequency diversity and neighbor channel diversity are achieved.

Figure 9:
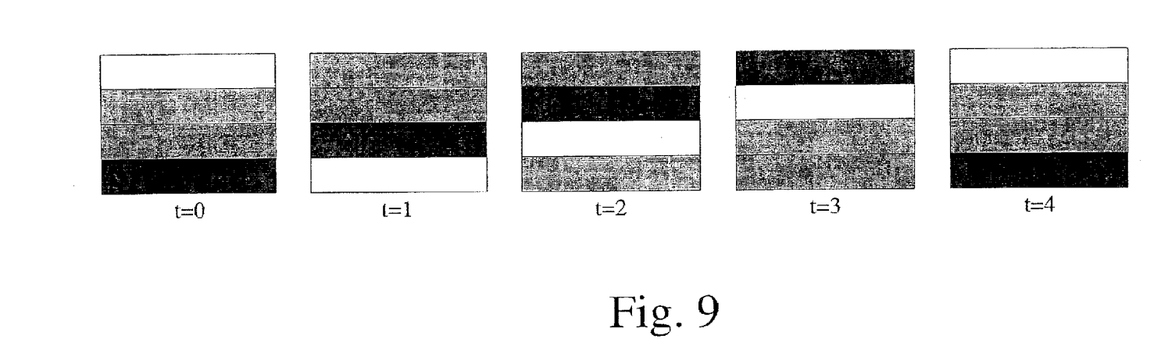
FIG. 9 shows a second use of the shuffling matrix according to the exemplary embodiments.

FIG. 9 shows a second use of the shuffling matrix according to the exemplary embodiments. Specifically, FIG. 9 illustrates a manner in which rows are shifted only. Row shifting is a cyclic row shifting which happens every DRS period. The row location of every channel group is cyclic shifted by one upward (or downward). This shifting repeats within a certain period called a discovery resource set repeat period (DRSRP). By this shifting, frequency diversity is achieved.

Figure 10:
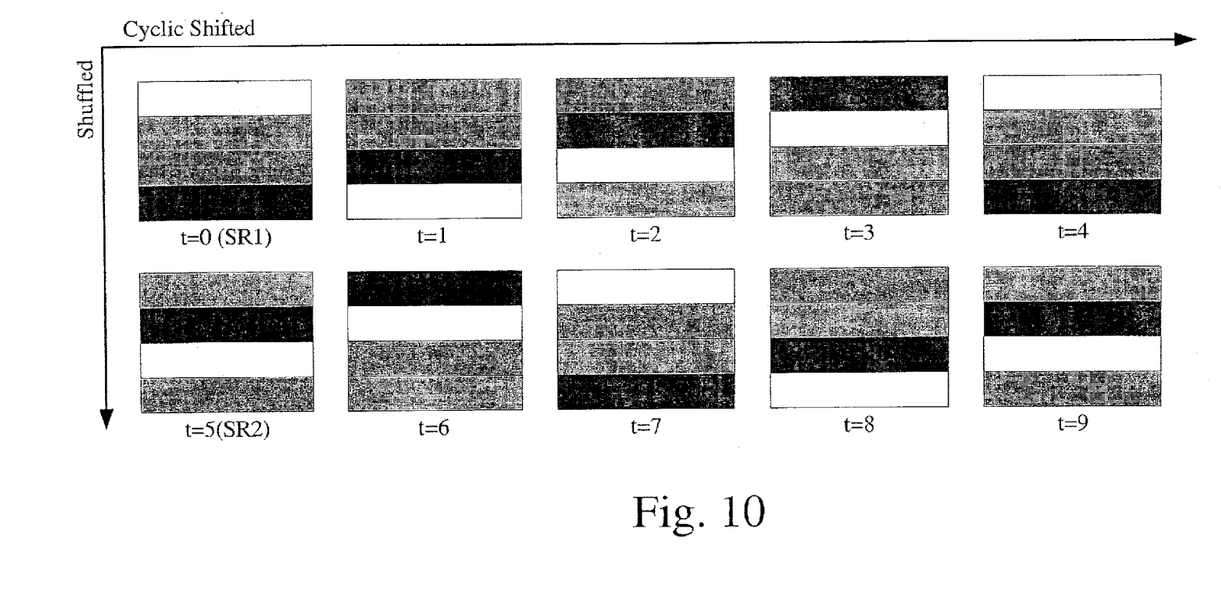
FIG. 10 shows a third use of the shuffling matrix according to the exemplary embodiments.

FIG. 10 shows a third use of the shuffling matrix according to the exemplary embodiments. FIG. 10 illustrates how row shifting and row shuffling are jointly performed. Rows are cyclic shifted every discovery resource set, and rows are shuffled every DRSRP (5 DRSRP as shown in FIG. 10) according to the shuffling matrix. By further utilizing the row shuffling, neighbor channel diversity is achieved.

The exemplary embodiments provide a device and method for a hopping scheme in a discovery process. Specifically, the exemplary embodiments provide a shuffling algorithm to generate a shuffling matrix for hopping. Each element of the shuffling matrix represents a discovery channel that a discovery resource is mapped to at known times of a sub-frame. Thus, once the shuffling matrix is determined, each mobile station of a cell is aware of the predetermined resources which is mapped to a discovery channel through which a discovery signal is broadcast or other mobile stations sending their discovery signals.

The exemplary embodiments include two variants for the shuffling algorithm to be applied to the shuffling matrix. In a first manner, the shuffling algorithm considers whether a resultant value based upon the number of channels is a prime number. When the number of channels is a prime number, a "good" shuffling matrix results. Therefore, when the resultant value based upon the number of channels is a composite number, this number is converted to a prime number to generate a shuffling matrix via dummy channels that are included and ultimately removed. In a second manner, the shuffling algorithm utilizes the fact that the number of channels is even. Using an interweaving process, the shuffling matrix may be generated.

Accordingly, by basing the hopping scheme as a function of the shuffling matrix generated from the shuffling algorithm, the hopping scheme maximizes the time interval between two time slots when any two mobile stations assigned to transmit discovery signals on adjacent. The maximized interval may relate to conventional hopping schemes that utilize random or pseudorandom sequences for the hopping scheme.

Those skilled in the art will understand that the above-described exemplary embodiments may be implemented in any suitable software or hardware configuration or combination thereof. For example, the exemplary embodiments of determining the hopping scheme may be embodied as a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a mobile station:
   receiving a number of channels N of a wireless network;
   generating a shuffling matrix as a function of the number of channels N, each row of the shuffling matrix being indicative of a respective one of a plurality of mobile stations, each column of the shuffling matrix being indicative of a respective broadcast time of a discovery signal in a hopping scheme; and
   generating the hopping scheme for the mobile stations in the channels as a function of the shuffling matrix,
   wherein the hopping scheme dynamically maps a physical resource of the mobile station to one of the channels,
   wherein the hopping scheme is generated such that each channel hops across all of the physical resources with substantially equal frequency, and
   wherein the hopping scheme maximizes an interval between two consecutive broadcast times that any two of the mobile stations are assigned to transmit discovery signals on adjacent channels.

2. The method of claim 1, wherein the shuffling matrix is generated as a function of whether a resultant value generated as a function of the number of channels N is a prime number.

3. The method of claim 2, further comprising:
   generating the shuffling matrix as one of a first shuffling matrix when the resultant value is prime and a second shuffling matrix when the resultant value is composite,
   wherein the first shuffling matrix has dimensions [N×N], and
   wherein the generating of the second shuffling matrix comprises:
   including a select number of dummy channels D such that the resultant value is prime;
   generating a temporary shuffling matrix having dimensions [(N+D)×(N+D)]; and
   removing the dummy channels D from the temporary shuffling matrix such that the second shuffling matrix has dimensions [N×(N+D)].

4. The method of claim 3, wherein the resultant value is generated by adding one to the number of channels N.

5. The method of claim 1, wherein the shuffling matrix is generated as a function of the number of channels N being even.

6. The method of claim 5, further comprising:
generating the shuffling matrix by dividing a first column into halves and interweaving positions of the halves to generate a further column, the shuffling matrix having dimensions [N×M].

7. The method of claim 6, wherein an n-th position in a first half of the first column of the shuffling matrix is moved to a 2*n-th position in a subsequent column and wherein an n-th position in a second half of the first column of the shuffling matrix is moved to a 2*n-1-th position in the subsequent column.

8. The method of claim 1, further comprising:
determining a modification to be applied to the shuffling matrix, the modification including an alteration to the columns;
generating an updated shuffling matrix as a function of the modification; and
generating the hopping scheme as a function of the updated shuffling matrix.

9. The method of claim 8, wherein the alteration to the columns is a reordering of the columns.

10. The method of claim 1, wherein the shuffling matrix is utilized by the hopping scheme using one of a cyclic row shift and a combined cyclic row shift and a row shuffle.

11. A device, comprising:
a processor coupled to a memory, wherein the processor is programmed to generate a hopping scheme by:
receiving a number of channels N of a wireless network;
generating a shuffling matrix as a function of the number of channels N, each row of the shuffling matrix being indicative of a respective one of a plurality of mobile stations, each column of the shuffling matrix being indicative of a respective broadcast time of a discovery signal in the hopping scheme; and
generating the hopping scheme for the mobile stations in the channels as a function of the shuffling matrix,
wherein the hopping scheme dynamically maps a physical resource of the mobile station to one of the channels,
wherein the hopping scheme is generated such that each channel hops across all of the physical resources with substantially equal frequency, and
wherein the hopping scheme maximizes an interval between two consecutive broadcast times that any two of the mobile stations are assigned to transmit discovery signals on adjacent channels.

12. The device of claim 11, wherein the processor is further programmed to generate the shuffling matrix as a function of whether a resultant value generated as a function of the number of channels N is a prime number.

13. The device of claim 12, wherein the processor is further programmed to generate the shuffling matrix as one of a first shuffling matrix when the resultant value is prime and a second shuffling matrix when the resultant value is composite, wherein the first shuffling matrix has dimensions [N×N], and wherein the processor is programmed to generate the second shuffling matrix by:
including a select number of dummy channels D such that the resultant value is prime;
generating a temporary shuffling matrix having dimensions [(N+D)×(N+D)]; and
removing the dummy channels D from the temporary shuffling matrix such that the second shuffling matrix has dimensions [N×(N+D)].

14. The device of claim 13, wherein the resultant value is generated by adding one to the number of channels N.

15. The device of claim 11, wherein the processor is programmed to generate the shuffling matrix as a function of the number of channels N being even.

16. The device of claim 15, wherein the processor is programmed to generate the shuffling matrix by dividing a first column into halves and interweaving positions of the halves to generate a further column, the shuffling matrix having dimensions [N×M].

17. The device of claim 11, wherein the processor is programmed to determine a modification to be applied to the shuffling matrix, the modification including an alteration to the columns, the processor is programmed to generate an updated shuffling matrix as a function of the modification, and wherein the processor is programmed to generate the hopping scheme as a function of the updated shuffling matrix.

18. The device of claim 17, wherein the alteration is a reordering of the columns.

19. The device of claim 11, further comprising:
a transceiver to broadcast the discovery signal on one of the channels assigned by the hopping scheme.

20. A non-transitory computer readable storage medium with an executable program stored thereon, wherein the program instructs a microprocessor to perform operations comprising:
receiving a number of channels N of a wireless network;
generating a shuffling matrix as a function of the number of channels N, each row of the shuffling matrix being indicative of a respective one of a plurality of mobile stations, each column of the shuffling matrix being indicative of a respective broadcast time of a discovery signal in a hopping scheme; and
generating the hopping scheme for the mobile stations in the channels as a function of the shuffling matrix,
wherein the hopping scheme dynamically maps a physical resource of the mobile station to one of the channels,
wherein the hopping scheme is generated such that each channel hops across all of the physical resources with substantially equal frequency, and
wherein the hopping scheme maximizes an interval between two consecutive broadcast times that any two of the mobile stations are assigned to transmit discovery signals on adjacent channels.

* * * * *